United States Patent [19]

Anderson et al.

[11] Patent Number: 4,522,995

[45] Date of Patent: Jun. 11, 1985

[54] FLUORINATED ALKYL ETHER-CONTAINING ETHYLENES, PRECURSORS THERETO, AND COPOLYMERS THEREOF WITH TETRAFLUOROETHYLENE

[75] Inventors: Arthur W. Anderson; Fritschel Scott J.; Howard E. Holmquist, all of Wilmington, Del.

[73] Assignee: E. I. Du Pont de Nemours and Company, Wilmington, Del.

[21] Appl. No.: 490,880

[22] Filed: May 2, 1983

[51] Int. Cl.$^3$ .................... C08F 214/18; C08F 214/26
[52] U.S. Cl. ...................................... 526/243; 526/247
[58] Field of Search ................................ 526/243, 247

[56] References Cited

U.S. PATENT DOCUMENTS

| | | | |
|---|---|---|---|
| 2,732,370 | 1/1956 | Codding | 526/247 |
| 3,420,793 | 1/1969 | Pittman et al. | 260/46.5 |
| 3,422,131 | 1/1969 | Pittman et al. | 260/448.2 |
| 3,441,431 | 4/1969 | Pittman et al. | 117/121 |
| 3,445,434 | 5/1969 | Stilmar | 260/80.71 |
| 3,465,045 | 9/1969 | Pittman et al. | 260/614 |
| 3,480,605 | 11/1969 | Pittman et al. | 526/247 |
| 3,529,003 | 9/1970 | Rausch et al. | 260/448.2 |
| 3,577,465 | 5/1971 | Anello et al. | 260/614 |
| 3,641,083 | 2/1972 | Anello et al. | 260/438.5 C |
| 3,758,543 | 9/1973 | Anello et al. | 260/458 |
| 3,911,072 | 10/1975 | Saito et al. | 526/247 |
| 3,940,207 | 2/1976 | Barkdoll | 526/247 |
| 4,178,218 | 12/1979 | Seko | 204/98 |
| 4,281,092 | 7/1981 | Breazeale | 526/247 |
| 4,357,218 | 11/1982 | Seko | 204/98 |

FOREIGN PATENT DOCUMENTS

690605 6/1967 Belgium .
1339789 12/1973 United Kingdom .

OTHER PUBLICATIONS

Xuebao et al., Acta Chemica Sinica, 40, No. 10, Oct. 82.
Pittman, Ludwig and Sharp, Polymers Derived from Fluoroketones. III. Monomer Synthesis, Polymerization, and Wetting Properties of Poly(allyl Ether) and Poly(vinyl Ether), J. Poly. Sci., Part A-1, vol. 6, pp. 1741-1750, (1968).

*Primary Examiner*—Harry Wong, Jr.

[57] ABSTRACT

Copolymers of TFE with fluorinated alkyl ethylenes which contain ether linkages are provided. The copolymers are thermally stable and useful as electrical insulation. Some of the copolymers contain functional groups and are hydrolyzable to fluorinated copolymers which contain acid functional groups. Novel monomers and precursors thereof are also provided.

6 Claims, No Drawings

FLUORINATED ALKYL ETHER-CONTAINING ETHYLENES, PRECURSORS THERETO, AND COPOLYMERS THEREOF WITH TETRAFLUOROETHYLENE

FIELD OF THE INVENTION

This invention relates to copolymers of tetrafluoroethylene, and more specifically to copolymers of tetrafluoroethylene and fluorinated alkyl ethylenes which contain ether linkages.

BACKGROUND OF THE INVENTION

Many copolymers of tetrafluoroethylene are known, but new copolymers of tetrafluoroethylene are always of interest due to a desire to obtain polymers having improved properties over polymers known heretofore.

U.S. Pat. No. 3,465,045 to Pittman et al. discloses the preparation, homopolymerization and copolymerization of $(CF_3)_2CFOCH=CH_2$, but copolymerization with tetrafluoroethylene (TFE) is not disclosed.

U.S. Pat. No. 3,577,465 to Anello et al. discloses the preparation of $(CF_3)_2CFOCF_2CF_2CH=CH_2$, but comopolymerization with TFE is not disclosed.

Belgian Pat. No. 690,605 (Hoechst) discloses various compounds of the formula $R_fOR$ where $R_f$ is perfluoroalkyl of at least 2 carbon atoms and R is various groups including beta-bromoethyl. Preparation of $(CF_3)_2CFOCH=CH_2$ is described. It is also disclosed that vinyl ethers such as the latter can be polymerized to oil- and water-repellant polymers, but copolymers with TFE are not disclosed.

It is an object of this invention to provide novel copolymers of TFE, novel monomers, and precursors thereto.

It is a more specific object of this invention to provide novel copolymers of TFE with fluorinated alkyl ethylenes which contain ether linkages, and novel such comonomers.

SUMMARY OF THE INVENTION

Briefly, the present invention provides copolymers of TFE and fluorinated alkyl ethylenes which contain ether linkages.

More specifically, there is provided according to the invention a copolymer comprising 90–99.8 mol % tetrafluoroethylene units and 0.2–10 mol % of substituted ethylene units of the formula

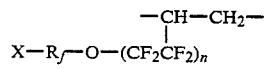

where n is 0 or 1; X is F—, $FSO_2$—, NC—, or $CF_3O(CF_2O)_m$— wherein m is 0, 1, 2 or 3; and $R_f$ is a divalent moiety $C_pF_{2p}$ wherein p is 2, 3, 4 or 5; said substituted ethylene units being randomly positioned throughout the copolymer chain.

Additionally, the present invention provides a substituted ethylene having the structural formula $YCF_2CF_2OCF_2CF_2CH=CH_2$, where Y is $FSO_2$—, NC—, or $CF_3O(CF_2O)_m$— wherein m is 0, 1, 2 or 3, and novel precursors thereto.

DETAILED DESCRIPTION OF THE INVENTION

The copolymers of the invention have compositions as defined hereinabove.

The copolymers can be made by copolymerizing TFE and a fluorinated alkyl ethylene containing one or more ether linkages under the influence of a free radical initiator. Ordinarily a solvent is used during the copolymerization. Both batch and continuous processes are suitable.

As solvents in the polymerization, fluoro- or chlorofluoro-hydrocarbons, preferably having 1 to 4, and especially 1 to 2, carbon atoms, are useful. Suitable solvents include: dichlorodifluoromethane, trichloromonofluoromethane, dichloromonofluoromethane, monochlorodifluoromethane, chlorotrifluoromethane, tetrafluoroethane, trichlorotrifluoroethane, dichlorotetrafluoroethane, fluorochloropropane, perfluoropropane, perfluorocyclobutane, etc. or mixtures thereof. It is best to use a saturated fluoro- or chlorofluoro-hydrocarbon which does not have a hydrogen atom in the molecule, such as dichlorodifluoromethane, trichloromonofluoromethane, trichlorotrifluoroethane, dichlorotetrafluoroethane, perfluorocyclobutane, etc., since such solvents have a tendency of increasing the molecular weight of the resulting copolymer. When such a solvent is used, good results are attainable when used in amounts of 0.5–20 mol and especially about 1–10 mol of the solvent per mol of monomer mixture of tetrafluoroethylene and ether-containing perfluoroalkyl ethylene monomer.

The copolymerization reaction can be carried out by using less than 0.5 mol of the solvent per mol of monomer mixture. However, it is advantageous to use more than 1 mol of solvent in order to enhance the rate of the copolymerization. It is possible to use more than 20 mols of solvent, but it is advantageous to use less than 10 mols per mol of monomer mixture for economic reasons, such as solvent recovery.

A mixture of a solvent as described above and other organic solvents may be used. It is also possible to use a mixed reaction medium of solvents as described above.

The advantage of using such a mixed solvent consists in easy stirring of the reaction system and easy removal of the heat of reaction. In accordance with the process of the invention, the conditions of the copolymerization can be varied depending upon the type of polymerization initiator or the reaction medium.

A wide variety of polymerization initiators can be used depending upon the polymerization system. However, when a solvent as described above is used, it is preferable to use a soluble free-radical polymerization initiator, such as an organic peroxy compound. It is possible to use high energy ionizing radiation of $10-10^5$ rad/hour dose rate. Suitable peroxy compounds may be the organic peroxides, e.g., benzoylperoxide or lauroylperoxide; peresters, e.g., t-butyl peroxyisobutyrate; or peroxy dicarbonates, e.g., 4-tert-butylcyclohexyl peroxydicarbonate, diisopropylperoxy dicarbonate, etc. It is especially preferred to use as the initiator in non-aqueous systems, a peroxide having the formula

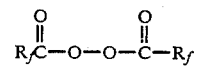

wherein R_f each represent perfluoroalkyl groups containing from 3-13 carbon atoms, in a solvent as described above. Suitable such peroxides include bis(perfluoropropionyl) peroxide, bis(perfluorohexanoyl) peroxide, etc.

The polymerization can be carried out at a temperature of between 30° and 110° C., and preferably at a temperature of between 40° and 80° C. Pressures employed in the polymerization are ordinarily those pressures between $0.1 \times 10^6$ and $7 \times 10^6$ pascals (1 and 70 kg/cm$^2$) and preferably are those between $0.3 \times 10^6$ and $3.5 \times 10^6$ pascals (3 and 35 kg/cm$^2$).

It is often preferable to include a small amount of a telogenic material in the reaction medium in order to control the molecular weight of the resulting copolymer. Alcohols such as methanol or ethanol, and alkanes such as ethane, butane, cyclohexane, etc., are suitable telogens.

The mixture of comonomers is agitated during polymerization.

The reaction may be carried out until solids content of the reaction mixture reaches about 12%.

If a large concentration, i.e., over about 3 mol %, of perfluoroalkyl ethylene is employed in batch runs, the polymerization reaction is inhibited, except for $(CF_3)_2CFOCH=CH_2$, which did not result in inhibition in any concentration employed.

It is possible, if desired, to carry out the polymerization in a continuous manner which maintains the concentration of the fluorinated alkyl ether-containing ethylene in the reaction mixture at a relatively constant and low concentration compared to the concentration of tetrafluoroethylene. More specifically, such a process can comprise (a) combining and agitating tetrafluoroethylene and the fluorinated alkyl ethylene in the presence of a nonaqueous solvent in a reaction vessel at a temperature of between 30° C. and 110° C. and a pressure of between $0.1 \times 10^6$ and $7 \times 10^6$ pascals (1 kg/cm$^2$ and 70 kg/cm$^2$) and preferably between $0.3 \times 10^6$ and $3.5 \times 10^6$ pascals (3 kg/cm$^2$ and 35 kg/cm$^2$), in the presence of a free-radical polymerization initiator, said combining of the tetrafluoroethylene and fluorinated alkyl ether-containing ethylene being carried out by continuously and uniformly adding fluorinated alkyl ether-containing ethylene to the reaction vessel in a manner which maintains a concentration of fluorinated alkyl ether-containing ethylene in the vessel during agitation below 2.5 mol %, and preferably below 1 mol %, relative to tetrafluoroethylene, said agitation being continued until copolymer formation has occurred, and (b) separating the copolymer from the other ingredients present in step (a).

The copolymers of the invention are non-brittle, non-elastomeric plastics, and are melt-processible. They can be hot-pressed into tough, clear films, and converted to melt extrudates that are strong and non-brittle. In these respects they differ from polytetrafluoroethylene (PTFE) and are more tractable than PTFE, even though the amount of comonomer incorporated is small. They also have good thermal and chemical stability.

By "nonelastomeric" is meant that the molded copolymer is not a material which at room temperature can be stretched repeatedly to at least twice its original length and, upon immediate release of the stress, will return with force to its approximate original length.

Novel fluorinated alkyl ethylenes containing one or more ether linkages provided by the invention have the structural formula $YCF_2CF_2OCF_2CF_2CH=CH_2$, where Y is $FSO_2$—, NC—, or $CF_3O(CF_2O)_m$— wherein m is 0, 1, 2 or 3.

Such monomers can be made by dehydroiodination of a precursor which is a compound having the structural formula $YCF_2CF_2OCF_2CF_2CH_2CH_2I$, where Y is $FSO_2$—, NC—, or $CF_3O(CF_2O)_m$— wherein m is 0, 1, 2 or 3.

The dehydroiodination step can be carried out by treatment of said precursor with a tertiary amine, optionally in a suitable solvent, at elevated temperature, e.g., 100°-150° C., or with aqueous caustic solution in those cases where the compound is not otherwise affected by caustic, at room temperature or above.

Said precursors are in turn made by insertion of ethylene into fluorinated iodo compounds, which can be represented by the formula
$YCF_2CF_2OCF_2I$, where Y is $FSO_2$—, NC—, or $CF_3O(CF_2O)_m$— wherein m is 0, 1, 2 or 3. Such compound where Y is $FSO_2$— is available by the method described in U.S. Pat. No. 4,254,030. The ethylene insertion reaction to make said precursors can be carried out by reaction of said fluorinated iodo compounds with ethylene at elevated temperature, typically 150°-200° C., under pressure, typically $1 \times 10^7$ to $1.5 \times 10^7$ pascals (1500-2200 psig).

Some of said fluorinated iodo compounds, i.e., $YCF_2CF_2OCF_2CF_2I$, where Y is NC— or $CF_3O(CF_2O)_m$— wherein m is 0, 1, 2 or 3 are also novel compounds and are provided by the present invention. Such compound where Y is $CF_3O$ $(CF_2O)_m$— is made by reacting the appropriate acyl fluoride, such as $CF_3OCF_2OCF_2COF$, with TFE, iodine and KF in a suitable solvent. Such compound where Y is NC— is made by reacting $NCCF_2COF$ with TFE, ICl and KF in a suitable solvent.

EXAMPLES

In the following examples, apparent melt viscosity was determined by calculations based on the melt flow rate. The melt flow rate was determined with the procedure of ASTM D1238 at a load of 5000 g except that the melt flow rate was determined in grams/minute rather than grams/10 minutes, and the equation used to calculate the apparent melt viscosity (MV) was:

$$(MV) = \frac{10.63 \times [\text{Total mass piston \& weight (g)}]}{\text{melt flow rate}}$$

This equation provides MV values in poises. $MV_5$ as reported herein in Table I is the MV so determined after holding the sample in melt form for 5 minutes just before determination of the melt flow rate. Melt viscosity is related to the molecular weight of the polymer.

Melting point was determined by Differential Scanning Calorimetry (DSC) at a rate of 15° C. per minute.

The comonomer content of the copolymers of the invention was estimated by a method based on melting point data. The method as used herein employs the melting point data obtained as indicated above and the method described by Paul J. Flory (see "Principles of Polymer Chemistry", Cornell University Press, Ithica, N.Y., 1953, p. 568), using the following equation:

$$\frac{1}{T_M} - \frac{1}{T_{TFE}} = \frac{-1.98}{685} (\ln N_{TFE})$$

where
$T_M$ = melting point of the copolymer in °K
$T_{TFE}$ = melting point of homopolymer PTFE (559.5°K)
$N_{TFE}$ = mole fraction TFE in the copolymer The numerical constants in the equation vary somewhat for different comonomers, and can be determined as described in the Flory reference cited above. The comonomer content of the copolymers disclosed herein was estimated from the equation with numerical constants derived for copolymers of TFE and nonafluorobutyl ethylene.

EXAMPLE 1

In a 110-ml stainless steel shaker tube were placed 0.052 g of 4-tert-butylcyclohexyl peroxydicarbonate and a solution of 1.3 g of vinyl heptafluoroisopropyl ether in 50 ml of 1,1,2-trichloro-1,2,2-trifluoroethane. The sample of vinyl heptafluoroisopropyl ether used had been shown by gas chromatography (GC) analysis to be 85% pure (the remaining 15% was believed to be vinyl bromide). The shaker tube was sealed, cooled with a solid $CO_2$/acetone bath, and briefly evacuated; then 10 g of tetrafluoroethylene was introduced. The tube and contents were shaken at 55°–65° C. and autogenous pressure for 4 hours (the first hour at 55°–58° C., the second at 59° C., the third at 58°–65° C., the fourth at 62°–65° C.). The product was a slurry, from which a white powder was collected by filtration. It weighed 10.3 g after drying overnight in a vacuum oven at 100° C. A sample was analyzed by Differential Scanning Calorimetry (DSC) to give m.p. 322.3° C., f.p. 303.0° C., re-melt m.p. 321.9° C. A sample of tetrafluoroethylene homopolymer prepared and isolated in the same way had m.p. 326.5° C., f.p. 307.6° C., re-melt m.p. 326.5° C. by DSC analysis. Another sample was used for determination of melt viscosity at 372° C., which was found to be $49.8 \times 10^4$ poises. The extrudate made during determination of the melt flow rate was flexible without breaking The infrared spectrum of a hot-pressed film showed absorption from CH bonds at 3.4, 7.0, 7.2 um and ether oxygen at 10.1–10.2 um. The amount of the ether-containing comonomer incorporated in the copolymer was estimated to be 0.4%.

EXAMPLE 2

In a 110-ml stainless steel shaker tube were placed 0.050 g of 4-tert-butylcyclohexyl peroxydicarbonate and a solution of 0.542 g (0.0025 mole) of vinyl heptafluoroisopropyl ether (purity 99% by GC analysis) in 50 ml of 1,1,2-trichloro-1,2,2-trifluoroethane. The shaker tube was sealed, cooled to −24° C. with a solid $CO_2$/acetone bath, and briefly evacuated; then 10 g of tetrafluoroethylene was introduced. The tube and contents were shaken at 50°–57° C. for one hour and then at 65°–70° C. for 3 hours at autogenous pressure. There was some mechanical loss during the run. The product was a gel-like slurry from which the solvent was evaporated to leave a white powder, wt. 6.1 g after drying overnight in a vacuum oven at 100° C. Analysis by DSC gave m.p. 325.6° C., f.p. 305.3° C., re-melt m.p. 325.1° C. Melt viscosity was $12 \times 10^4$ poises at 372° C. The extrudate made during determination of the melt flow rate was flexible without breaking. The infrared spectrum of a hot-pressed film closely resembled that of the polymer of Example 1. The amount of the ether-containing comonomer incorporated in the copolymer was estimated to be 0.2%.

EXAMPLE 3

Preparation of 2,2,3,3,5,5,6,6-octafluoro-4-oxa-7-octenenitrile ($CH_2$=$CHCF_2CF_2OCF_2CF_2CN$).

A. Preparation of 6-Iodoperfluoro-4-Oxahexanenitrile (First Intermediate)

In a 500 ml three-necked flask fitted with a solid $CO_2$ condenser, a serum cap, and a magnetic stirrer bar was placed 29.0 g of anhydrous potassium fluoride that had been dried in a vacuum oven at 100° C. The flask was evacuated, flamed, and brought to atmospheric pressure with dry nitrogen. This cycle was repeated twice. Then 200 ml of anhydrous 2-methoxyethyl ether was added through the serum cap with a hypodermic syringe. The flask was cooled with a bath of solid $CO_2$ and acetone. Into a trap cooled with a mixture of solid $CO_2$ and acetone was condensed 73 g of cyanodifluoroacetyl fluoride which was then allowed to come to ambient temperature slowly while evaporated through a hypodermic needle through the serum cap into the stirred mixture of KF and 2-methoxyethyl ether over a period of 65 minutes. The stirring was continued for another 5 hours during which most of the KF dissolved. The mixture was allowed to come to ambient temperature and stand for several hours. It was then placed in a 400 ml stainless steel shaker tube with 100 g of iodine monochloride (ICl). After the tube was sealed and cooled to 12° C., 50 g of tetrafluoroethylene was added. The tube and contents were shaken at 44°–47° C. for 10 hours. The product, combined with rinsings with 1,1,2-trichloro-1,2,2-trifluoroethane, was poured into cold water and filtered to remove some iodine. The lower layer was washed with 5% aqueous $Na_2SO_3$ solution and water, dried over $MgSO_4$, filtered, and fractionally distilled. The fractions boiling at 93°–95° C. (atmospheric pressure) and 41°–42° C. (100 mm pressure) were primarily (by GC analysis) 6-iodoperfluoro-4-oxahexanenitrile ($ICF_2CF_2OCF_2CF_2CN$). Its yield as calculated from GC analysis data of all the distillation fractions was 18.2 g. It was identified by $^{19}$F-NMR analysis which showed lines at −66.3 ppm for $CF_2$ adjacent to I, −87.0 and −88.7 ppm for the two $CF_2$ groups adjacent to 0, and −110.6 ppm for $CF_2$ group adjacent to CN. The infrared spectrum showed a strong absorption band for −CN at 4.4 um.

B. Conversion to the Ethylene Insertion Compound (Second Intermediate)

In a 70 ml stainless steel shaker tube were placed 13.9 g of 6-iodoperfluoro-4-oxahexanenitrile and 17 ml of 1,1,2-trichloro-1,2,2-trifluoroethane. The tube was sealed and ethylene was introduced. The tube and contents were shaken at 150° C. and $1 \times 10^7$ pascals (1500 psig) for 2 hours and then at 200° C. and up to $1.5 \times 10^7$ pascals (2200 psig) for 16 hours. The product was fractionally distilled to give 8-iodo-2,2,3,3,5,5,6,6-octafluoro-4-oxaoctanenitrile, b.p. of main fraction 69°–70° (24 mm), wt. 11.3 g (by GC analyses of all fractions). The $^1$H and $^{19}$F-NMR spectra were consistent with the structure ($^1$H: two complex systems of lines in the 2.3–3.3 ppm region; $^{19}$F: single lines at −88.0, −110.1, −120.2 ppm).

C. Conversion to the Olefin by Dehydroiodination

In a flask fitted with a thermometer, a magnetic stirring bar, and a still head were placed 4.5 g of tri-n- propylamine, 9.1 g of 8-iodo-2,2,3,3,5,5,6,6-octafluoro-4-oxaoctanenitrile, and 6 ml of 2-methoxyethyl ether. The flask and contents were heated rapidly to 145° C. and then stirred at 130°–145° C. for 3½ hours during which a colorless distillate was collected. Further distillate was obtained by reducing the pressure to 24 mm. The distillate was fractionally distilled to give 2,2,3,3,5,5,6,6-octafluoro-4-oxa-7-octenenitrile (4.14 g, 67.1% yield), b.p. 84° C. The $^1$H-NMR spectrum showed a multiple line pattern between 5.2 and 5.6 ppm; the $^{19}$F-NMR spectrum contained three lines: at −89.1 ppm for $CF_2$ groups surrounding O, −113.0 ppm for $CF_2$ adjacent to CN, and −120.4 ppm for $CF_2$ adjacent to $CH=CH_2$ group (integral ratios 2:1:1).

EXAMPLE 4

Preparation of
7-fluorosulfonyl-1,1,2-trihydroperfluoro-5-oxa-1-heptene ($CH_2=CHCF_2CF_2OCF_2CF_2SO_2F$)

A. Ethylene Insertion Step

In a 70-ml stainless steel shaker tube were placed 18.06 g of 1-iodo-5-fluorosulfonylperfluoro-3-oxapentane (prepared under conditions similar to those described in U.S. Pat. No. 4,254,030) dissolved in 40 ml of 1,1,2-trichloro-1,2,2-trifluoroethane. The tube was sealed and ethylene was introduced to a pressure of $1.4 \times 10^6$ pascals (200 psig). The tube and contents were shaken and rapidly heated to 200° C. Ethylene pressure was increased to and maintained at $1.4 \times 10^7$ pascals (2000 psig) by constant repressuring for 17 hours. The product was fractionally distilled to give 1-iodo-7-fluorosulfonyl-3,3,4,4,6,6,7,7-octafluoro-5-oxaheptane, 11.0 g, b.p. 70°–71° C. at 13 mm, $n_D$ 1.3790. The $^1$H and $^{19}$F-NMR spectra of the product were consistent with the structure.

B. Dehydroiodination Step

In a flask fitted with a thermometer, a magnetic stirring bar, an addition funnel, and a still head were placed 4.0 g of tri-n-propylamine and 5 ml of 2-methoxyethyl ether. The solution was stirred at 120°–130° C. while 11.0 g of 1-iodo-7-fluorosulfonyl-3,3,4,4,6,6,7,7-octafluoro-5-oxaheptane in 5 ml of 2-methoxyethyl ether was added over a 12-minute period. The mixture was stirred at 135° C. for 3 hours. Then the temperature was lowered to 70° C. and the pressure gradually lowered to about −10 mm. A distillate was collected in a receiver cooled with an acetone-solid $CO_2$ bath, diluted with 1,1,2-trichloro-1,2,2-trifluoroethane solvent, washed with water, dried over anhydrous $MgSO_4$, filtered, and fractionally distilled to give 7-fluorosulfonyl-1,1,2-trihydroperfluoro-5-oxa-1-heptene, b.p. 45° at 60 mm, 3.5 g, $n_D$ 1.3131. The $^1$H-NMR spectrum shows a group of lines in the 5.3–5.7 ppm range; the $^{19}$F-NMR spectrum contained 5 lines: 42.9, −83.1, −89.5, −114.9, −120.3 ppm (integral ratio 1:2:2:2:2).

EXAMPLE 5

Preparation of
1,1,2-trihydroperfluoro-5,8,-10-trioxa-1-undecene
($CH_2=CHCF_2CF_2OCF_2CF_2OCF_2OCF_3$)

A. Preparation of 9-Iodo-2,4,7-Trioxaperfluoronane (First Intermediate)

In a 400 ml shaker tube were placed 80.0 g of iodine, 13.0 g of anhydrous KF, 200 ml of anhydrous 2-methoxyethyl ether, and 103.8 g of a distillation fraction containing (by GC analysis) 51.1 g of perfluoro-3,5-dioxahexanoyl fluoride and 52.3 g of 1,1,2-trichloro-1,2,2-trifluoroethane. The tube was sealed, cooled in an acetone-solid $CO_2$ bath, evacuated briefly, and charged with 50 g of tetrafluoroethylene. The tube and contents were shaken at 80° C. and autogenous pressure for 5 hours. The product was poured into water; the bottom layer was washed with 5% aqueous $Na_2SO_3$ solution, dried over anhydrous $MgSO_4$, and fractionally distilled. The fraction with b.p. 108° C., $n_D$ 1.3083, 3.2 g, was identified by NMR as 9-iodo-2,4,7-trioxaperfluorononane. The $^{19}$F spectrum contained six lines at −54.5, −58.0, −64.9, −86.6, −89.5, −91.0 ppm in integral ratios 2:3:2:2:2:2.

B. Ethylene Insertion Step

In a 75 ml stainless steel shaker tube were placed 9.2 g of 9-iodo-2,4,7-trioxaperfluorononane and 40 ml of 1,1,2-trichloro-1,2,2-trifluoroethane. The tube was sealed, cooled, and briefly evacuated. Ethylene was introduced at an initial pressure of $1.4 \times 10^6$ pascals (200 psig). The tube and contents were shaken at 150° C. and $7 \times 10^6$ pascals (1000 psig) for one hour, 175° C. and $1 \times 10^7$ pascals (1500 psig) for one hour, and 200° C. and $1.4 \times 10^7$ pascals (2050 psig) for 8½ hours. The product was fractionally distilled. The fraction boiling at 53°–55° at 9 mm, 1.2 g was identified by NMR as 11-iodo-10,10,11,11-tetrahydroperfluoro-2,4,7-trioxaundecane.

C. Dehydroiodination Step

In a 50 ml bottle were placed 9.24 g of 11-iodo-10,10,11,11-tetrahydroperfluoro-2,4,7-trioxaundecane, 1.214 g of TLF-2370-C surfactant, 2.756 g of 50% aqueous NaOH solution, and 3 ml of dichloromethane. The bottle was shaken on a wrist-action shaking apparatus for six hours. The nonaqueous layer was dried and fractionally distilled. The fractions boiling at 101°–112° C., 2.5 g, were shown by GC and NMR analyses to be mostly 1,1,2-trihydroperfluoro-5,8,10-trioxa-1-undecene.

EXAMPLE 6–16

Preparation of Copolymers with Tetrafluoroethylene.

The amounts of tetrafluoroethylene, comonomer, initiator (4-tert-butylcyclohexyl peroxydicarbonate), and solvent (1,1,2-trichloro-1,2,2-trifluoroethane) are listed in Table I. The time of reaction (4 hours) and size of stainless steel shaker tube (110 mm) were the same in each run. Temperature of polymerization was mostly in the 55°–65° C. range and is also listed in Table I. Most of the copolymers gave non-brittle extrudates after fusion, and tough flexible hot-pressed films.

The infrared spectra of all the copolymers show absorption bands corresponding to C—H bonds, and those of the copolymers containing NC— or $FSO_2$— groups show absorption bands corresponding to those groups as well.

TABLE I

| EX. | COMONOMER (1) | VOL. SOLVENT ml (2) | WT. TFE g | WT. COMONOMER g | WT. INITIATOR g | TEMP. °C | YIELD % | M.P. °C (3) | Incorporation (mol %) | MV$_5$ ($\times 10^{-4}$ poises) at 372° C. |
|---|---|---|---|---|---|---|---|---|---|---|
| 6  | A | 50 | 10 | 0.502  | 0.051 | 52–66 | 91 | 324.0 | 0.4 | —   |
| 7  | A | 50 | 13 | 0.851  | 0.065 | 55–70 | 81 | 322.3 | 0.5 | —   |
| 8  | B | 50 | 25 | 0.918  | 0.050 | 52–70 | 82 | 320.3 | 0.7 | —   |
| 9  | B | 50 | 10 | 0.6602 | 0.050 | 55–62 | 90 | 317.5 | 0.9 | 24  |
| 10 | B | 50 | 12 | 1.119  | 0.060 | 55–68 | 92 | 319.7 | 0.8 | 2   |
| 11 | C | 46 | 9  | 0.551  | 0.046 | 55–67 | 89 | 320.7 | 0.6 | 144 |
| 12 | C | 30 | 6  | 0.586  | 0.030 | 52–68 | 76 | 321.2 | 0.7 | —   |
| 13 | D | 50 | 10 | 0.3178 | 0.051 | 57–61 | 88 | 319.7 | 0.7 | 117 |
| 14 | D | 50 | 10 | 0.6283 | 0.050 | 56–63 | 81 | 317.5 | 0.9 | 54  |
| 15 | D | 50 | 11 | 0.996  | 0.055 | 55–70 | 85 | 319.7 | 0.8 | 1   |
| 16 | D | 50 | 10 | 1.115  | 0.050 | 55–68 | 94 | 320.0 | 0.7 | 2   |

Notes to Table I
(1) Comonomer A is NCCF$_2$CF$_2$OCF$_2$CF$_2$CH=CH$_2$
Comonomer B is FSO$_2$CF$_2$OCF$_2$CF$_2$CH=CH$_2$
Comonomer C is CF$_3$OCF$_2$OCF$_2$CF$_2$OCF$_2$CF$_2$CH=CH$_2$
Comonomer D is (CF$_3$)$_2$CFOCF$_2$CF$_2$CH=CH$_2$ and was prepared by method of French Patent 1,578,003
(2) Solvent is 1,1,2-trichloro-1,2,2-trifluoroethane
(3) On re-melt cycle by Differential Scanning Calorimetry

INDUSTRIAL APPLICABILITY

The copolymers are useful as insulation coating for electrical wires and as linings for equipment exposed to harsh chemical environments.

We claim:

1. A copolymer that is melt-processible, non-elastomeric, and is non-brittle in extruded form, which copolymer consists of 90–99.8 mol % tetrafluoroethylene units and 0.2–10 mol % of substituted ethylene units of the formula $$\begin{array}{c} -CH-CH_2- \\ | \\ X-R_f-O-(CF_2CF_2)_n \end{array}$$

where n is 0 or 1; X is F—, FSO$_2$—, NC—, or CF$_3$O(CF$_2$O)$_m$— wherein m is 0, 1, 2 or 3; and R$_f$ is a divalent moiety C$_p$F$_{2p}$ wherein p is 2, 3, 4 or 5; said substituted ethylene units being randomly positioned throughout the copolymer chain.

2. A copolymer of claim 1 wherein n is 0, R$_f$ is $$\begin{array}{c} -CF_2-CF-, \\ | \\ CF_3 \end{array}$$

and X is F—.

3. A copolymer of claim 1 wherein n is 1, R$_f$ is $$\begin{array}{c} -CF_2-CF-, \\ | \\ CF_3 \end{array}$$

and X is F—.

4. A copolymer of claim 1 wherein n is 1, R$_f$ is —CF$_2$—CF$_2$—, and X is FSO$_2$—.

5. A copolymer of claim 1 wherein n is 1, R$_f$ is —CF$_2$—CF$_2$—, and X is NC—.

6. A copolymer of claim 1 wherein n is 1, R$_f$ is —CF$_2$—CF$_2$—, and X is CF$_3$O(CF$_2$O)$_m$— wherein m is 1.

* * * * *

UNITED STATES PATENT OFFICE
CERTIFICATE OF CORRECTION

PATENT NO. : 4,522,995

DATED : June 11, 1985

INVENTOR(S) : Arthur William Anderson, Scott James Fritschel, and Howard Emil Holmquist It is certified that error appears in the above-identified patent and that said Letters Patent are hereby corrected as shown below:

Column 5, line 4, the number "559.5°K" should read "600°K"

Signed and Sealed this

Twenty-second Day of October 1985

[SEAL]

Attest:

DONALD J. QUIGG

Attesting Officer

Commissioner of Patents and
Trademarks—Designate